United States Patent
Nammi et al.

(10) Patent No.: US 11,564,238 B2
(45) Date of Patent: Jan. 24, 2023

(54) NETWORK NODE, A WIRELESS DEVICE AND RESPECTIVE METHOD PERFORMED THEREBY FOR COMMUNICATING THEREBETWEEN

(71) Applicant: Telefonaktiebolaget LM Ericsson (publ), Stockholm (SE)

(72) Inventors: Sairamesh Nammi, Austin, TX (US); Alireza Nejatian, Uppsala (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 536 days.

(21) Appl. No.: 15/736,241

(22) PCT Filed: Jul. 3, 2015

(86) PCT No.: PCT/SE2015/050785
§ 371 (c)(1),
(2) Date: Dec. 13, 2017

(87) PCT Pub. No.: WO2017/007375
PCT Pub. Date: Jan. 12, 2017

(65) Prior Publication Data
US 2018/0184437 A1    Jun. 28, 2018

(51) Int. Cl.
*H04W 72/08* (2009.01)
*H04B 17/309* (2015.01)
*H04B 17/382* (2015.01)

(52) U.S. Cl.
CPC ........ *H04W 72/085* (2013.01); *H04B 17/309* (2015.01); *H04B 17/382* (2015.01)

(58) Field of Classification Search
None
See application file for complete search history.

(56) References Cited

U.S. PATENT DOCUMENTS

2009/0274224 A1 * 11/2009 Harris ................ H04L 1/003
375/260
2012/0026986 A1   2/2012 Dass
(Continued)

FOREIGN PATENT DOCUMENTS

| EP | 1845678 A1 | 10/2007 |
| WO | 2008115772 A1 | 9/2008 |
| WO | 2014000227 A1 | 1/2014 |

OTHER PUBLICATIONS

Extended European Search Report for European Patent Application No. 15897830.4, dated Dec. 17, 2018, 10 pages.
(Continued)

*Primary Examiner* — Christine T Duong
(74) *Attorney, Agent, or Firm* — Withrow & Terranova, PLLC

(57) ABSTRACT

A network node and a wireless device as well as respective method performed thereby for communication with each other are provided. The method performed by the network node comprises receiving, from the wireless device, a measurement report indicating a channel quality of the channel between the network node and the wireless device; and determining whether the channel quality is acceptable or unacceptable. The method further comprises transmitting, to the wireless device, an indication of which RBG(s) to report channel quality measurements for, when the channel quality is unacceptable.

16 Claims, 15 Drawing Sheets

(56) References Cited

U.S. PATENT DOCUMENTS

| | | | | |
|---|---|---|---|---|
| 2013/0242902 A1* | 9/2013 | Liu | ............... | H04W 24/10 |
| | | | | 370/329 |
| 2014/0204879 A1* | 7/2014 | Yang | ............... | H04L 5/0023 |
| | | | | 370/329 |
| 2014/0301340 A1* | 10/2014 | Benjebbour | ........ | H04L 27/261 |
| | | | | 370/329 |
| 2015/0382222 A1 | 12/2015 | Park et al. | | |

OTHER PUBLICATIONS

Motorola, "R1-060381: Frequency Domain Scheduling for E-UTRA," Third Generation Partnership Project (3GPP) TSG RAN1#44, Feb. 13-17, 2006, 9 pages, Denver, US.
International Search Report and Written Opinion for International Patent Application No. PCT/SE2015/050785, dated Mar. 9, 2016, 13 pages.
Extended European Search Report for European Patent Application No. 21209959.2, dated May 3, 2022, 8 pages.

* cited by examiner

| RBG Index | 1 | 2 | 3 | 4 | 5 | 6 | 7 | 8 | 9 | 10 |
|---|---|---|---|---|---|---|---|---|---|---|
|  | 0 | 1 | 1 | 1 | 1 | 1 | 1 | 1 | 1 | 0 | ns
NETWORK NODE, A WIRELESS DEVICE AND RESPECTIVE METHOD PERFORMED THEREBY FOR COMMUNICATING THEREBETWEEN

This application is a 35 U.S.C. § 371 national phase filing of International Application No. PCT/SE2015/050785, filed Jul. 3, 2015, the disclosure of which is incorporated herein by reference in its entirety.

TECHNICAL FIELD

The present disclosure relates to wireless communication and in particular to wireless communication between a network node and a wireless device in a wireless communication network employing Orthogonal Frequency Division Multiplexing, OFDM technology.

BACKGROUND

The $3^{rd}$ Generation Partnership Project, 3GPP, Long Term Evolution, LTE represents the project with an aim to improve the Universal Mobile Telecommunications System, UMTS, standard. 3GPP LTE radio interface offers high peak data rates, low delays and spectral efficiencies. LTE ecosystem supports both Frequency division duplex, FDD, and Time division duplex, TDD, and half duplex. This enables the operators to exploit both the paired and unpaired spectrum since LTE has flexibility in bandwidth as it supports different bandwidth as single or carrier aggregation. 6 different bandwidths 1.4 MHz, 3 MHz, 5 MHz, 10 MHz, 15 MHz and 20 MHz are standardised in 3GPP.

The LTE physical layer is designed to achieve higher data rates, and is facilitated by turbo coding/decoding, and higher order modulations (up to 64-Quadrature Amplitude Modulation, QAM). The modulation and coding is adaptive, and depends on channel conditions. Orthogonal Frequency Division Multiple Access, OFDMA, is used for the downlink, while Single Carrier Frequency Division Multiple Access, SC-FDMA, is used for the uplink. The main advantage of such schemes is that the channel response is flat over a sub-carrier even though the multi-path environment could be frequency selective over the entire bandwidth. This reduces the complexity involved in equalisation, as simple single tap frequency domain equalisers can be used at the receiver. OFDMA allows LTE to achieve its goal of higher data rates, reduced latency and improved capacity/coverage, with reduced costs to the operator. The LTE physical layer supports Hybrid Automatic Repeat Request, HARQ, power weighting of physical resources, uplink power control, and Multiple Input Multiple Output, MIMO. By using multiple parallel data streams transmission to a single terminal, data rate can be increased significantly.

In a multi-path environment, such a multiple access scheme also provides opportunities for performance enhancing scheduling strategies. Frequency Selective Scheduling, FSS, may now be used to schedule a user over sub-carriers (or part of the bandwidth) that provides maximum channel gains to that user (and avoid regions of low channel gain). The channel response is measured and the scheduler utilises this information to intelligently assign resources to users over parts of the bandwidth that maximise their Signal-to-Noise Ratios, SNR, (and spectral efficiency). In other words, the end to end performance of a multi-carrier system like LTE relies significantly on sub-carrier allocation techniques and transmission modes. LTE allows for different opportunistic scheduling techniques.

Driven by growing number of LTE subscribers worldwide, the 3GPP started a new activity using unlicensed spectrum with LTE alongside licensed spectrum. This is known as License Assisted Access, LAA. This would allow operators to benefit from the additional capacity available from the unlicensed spectrum, particularly in hotspots and corporate environments. With LAA, the extra spectrum resource, especially on the 5 GHz frequency band, can complement licensed band LTE operation.

FIG. 1a shows the general block diagram of the communication system (LTE/LAA). Input bits from the upper layers are passed through the baseband blocks which typically consist of channel encoder, interleaver and rate matching, modulator, layer mapper, OFDM modulator etc. Once the baseband signal is generated, it needs to be passed through the Radio-Frequency, RF, chain before it sent to the antenna ports. The RF chain typically consists of Digital to Analog Converter (DAC), I/Q modulator, oscillators, and Power amplifiers, PAs. Note that the baseband signal generation depends on the scheduler decisions from the upper layers e.g. layer 2 such as Medium Access Control, MAC, layer. Scheduler decisions are also influenced by the contents of the feedback channel from the receiver. For example the receiver can inform what kind of modulation and code rate is suitable at any given instance. It might also include what resource block groups the User Equipment, UE, prefers scheduling etc. For example when the receiver is having good signal to ratio, it might prefer higher order modulation say 256-QAM or 64-QAM in certain resource blocks and prefers lower modulation such as QPSK or 16-QAM in other resource group blocks and when the receiver is having low signal to noise ratio, it might prefer low order modulation such as QPSK or 16-QAM in one or more resource blocks.

In general the power amplifiers in the RF block needs to be operated in the non-linear region for achieving good efficiency. FIG. 1b illustrates the typical AM/AM curve for a power amplifier. The input/output curve is highly non-linear.

When the power amplifier operates in the non-linear region, some of the signals are easily leaked to the other frequency bands (adjacent carrier bandwidths). FIG. 1c illustrates the spectral regrowth due to PA non-linearity. It can be seen from FIG. 1c that, the power spectral density plot is distorted, and there is a leakage of the desired signal to the adjacent channel bandwidths.

Adjacent Channel Leakage Ratio, ACLR, is used as a metric to measure the leakage due to non-linear power amplifier. In FIG. 1c the ACLR with ideal PA is around −100 dBc, while with realistic PA (with non-linearity), the ACLR is around −38 dBc.

One method to compensate for the non-linearity of the power amplifier is to distort the input signal to the power amplifier such that the output signal from the power amplifier is transformed to be close to what it would have been if the power amplifier would have been linear. An example of such method is called Digital Pre-Distortion, DPD, technique. In general DPD may interchangeably be called as a signal linearization circuitry or component or mechanism or scheme.

FIG. 1d illustrates the spectral regrowth with DPD. It can be seen that the spectral regrowth is reduced when DPD is applied. ACLR in this case is around −50 dBc.

DPD techniques require lot of computational resources in addition to extra hardware and power which is not useful for low complexity and low cost implementation of transmitter in a radio node. One example of such a low cost radio is LAA base station that competing with Wi-Fi AP price wise.

LAA requires mass or bulk deployment within a cell. Hence for this purposes it was proposed to relax the ACLR requirement of the current 3GPP LTE standard as the LAA base stations transmit with low power say 30 dBm Effective Isotropic Radiated Power, EIRP, inclusive 6 dBi antenna gain or 24 dBm conducted power. In these cases i.e. that if no DPD is used, some of the total transmitted power is leaked into the other bands without any steep filter. However, steep filtering with sharp edges is almost impossible to implement. Hence without steep filtering and DPD, the emissions, causes non-uniform allocation of power within the operating bandwidth.

Data transmission with non-uniform power allocation implies inefficient use of resources. For example if the wireless devices are scheduled on these frequency carriers, the network node may not serve these wireless devices with correct order modulation and higher transport block sizes even though the wireless devices recommend these modulation and transport block sizes. Hence the inaccuracies in link adaptation cause high packet errors there by reducing the link as well as system throughput. FIG. 1e shows the link throughput degradation for 2×2 M IMO system (Transmission mode 4) when the wireless device is scheduled on the band edges. It can be observed that significant loss in throughput is observed with power leakage.

SUMMARY

The object is to obviate at least some of the problems outlined above. In particular, it is an object to provide a network node, a wireless device and respective methods performed thereby for communication with each other. These objects and others may be obtained by providing a network node and a wireless device and a method performed by a network node and a wireless device according to the independent claims attached below.

According to an aspect, a method performed by a network node for communicating with a wireless device is provided. The network node and the wireless device being operable in a wireless communication network employing Orthogonal Frequency Division Multiplexing, OFDM, technology. A channel between the network node and the wireless device comprises a set of Resource Block Groups. The method comprises receiving, from the wireless device, a measurement report indicating a channel quality of the channel between the network node and the wireless device; and determining whether the channel quality is acceptable or unacceptable. The method further comprises transmitting, to the wireless device, an indication of which RBG(s) to report channel quality measurements for, when the channel quality is unacceptable.

According to an aspect, a method performed by a wireless device for communicating with a network node is provided. The wireless device and the network node being operable in a wireless communication network employing OFDM technology. A channel between the network node and the wireless device comprises a set of RBGs. The method comprises receiving, from the network node, an indication of which RBG(s) to report channel quality measurements for, when the channel quality is unacceptable, wherein the indication excludes at least the first and the last RBG at the frequency band edges. The method further comprises performing a channel quality measurement at least for the RBG(s) specified in the indication; and transmitting, to the network node, a channel quality measurement report for the RBG(s) specified in the indication.

According to an aspect, a network node for communicating with a wireless device is provided. The network node and the wireless device are operable in a wireless communication network employing OFDM technology, wherein a channel between the network node and the wireless device comprises a set of RBGs. network node is configured for receiving, from the wireless device, a measurement report indicating a channel quality of the channel between the network node and the wireless device; and determining whether the channel quality is acceptable or unacceptable. The network node is further configured for transmitting, to the wireless device, an indication of which RBG(s) to report channel quality measurements for, when the channel quality is unacceptable.

According to an aspect, a wireless device for for communicating with a network node is provided. The wireless device and the network node are operable in a wireless communication network employing OFDM technology wherein a channel between the network node and the wireless device comprises a set of RBGs. The wireless device is configured for receiving, from the network node, an indication of which RBG(s) to report channel quality measurements for, when the channel quality is unacceptable, wherein the indication excludes at least the first and the last RBG at the frequency band edges. The wireless device is further configured for performing a channel quality measurement at least for the RBG(s) specified in the indication, and; transmitting, to the network node, a channel quality measurement report for the RBG(s) specified in the indication.

The method performed by the network node, the method performed by the wireless device, the network node and the wireless device have several advantages. One possible advantage is that it provides increased flexibility to the network node for scheduling the wireless device in frequency bands, RBGs, that may improve throughput on the channel between the network node and the wireless device.

BRIEF DESCRIPTION OF DRAWINGS

Embodiments will now be described in more detail in relation to the accompanying drawings, in which.

DETAILED DESCRIPTION

Briefly described, a network node and a wireless device as well as respective method performed thereby for communication with each other are provided. The network node may monitor the channel quality and when the channel quality becomes unacceptable, e.g. passes the threshold, the network node informs the wireless device that the wireless henceforth shall exclude some of the RBGs of the channel between the network node and the wireless device when reporting channel quality measurement information. In this manner, possible leakage, due to non-linear power amplifier(s), into adjacent frequency bands may be reduced or reduced.

Embodiments herein relate to a method performed by a network node for communicating with a wireless device, the network node and the wireless device being operable in a wireless communication network employing Orthogonal Frequency Division Multiplexing, OFDM technology. A channel between the network node and the wireless device comprises a set of Resource Block Groups, RBGs. Embodiments of such a method will now be described with reference to FIGS. 2a-2c.

Figure 1A:
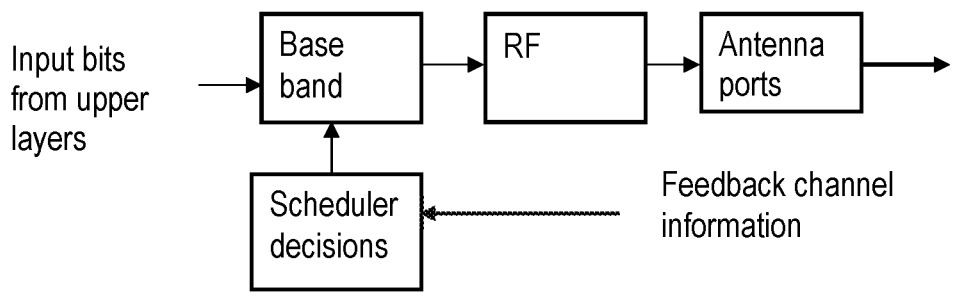
FIG. 1a is a block diagram schematically illustrating an adaptive wireless communication system.
Figure 1B:
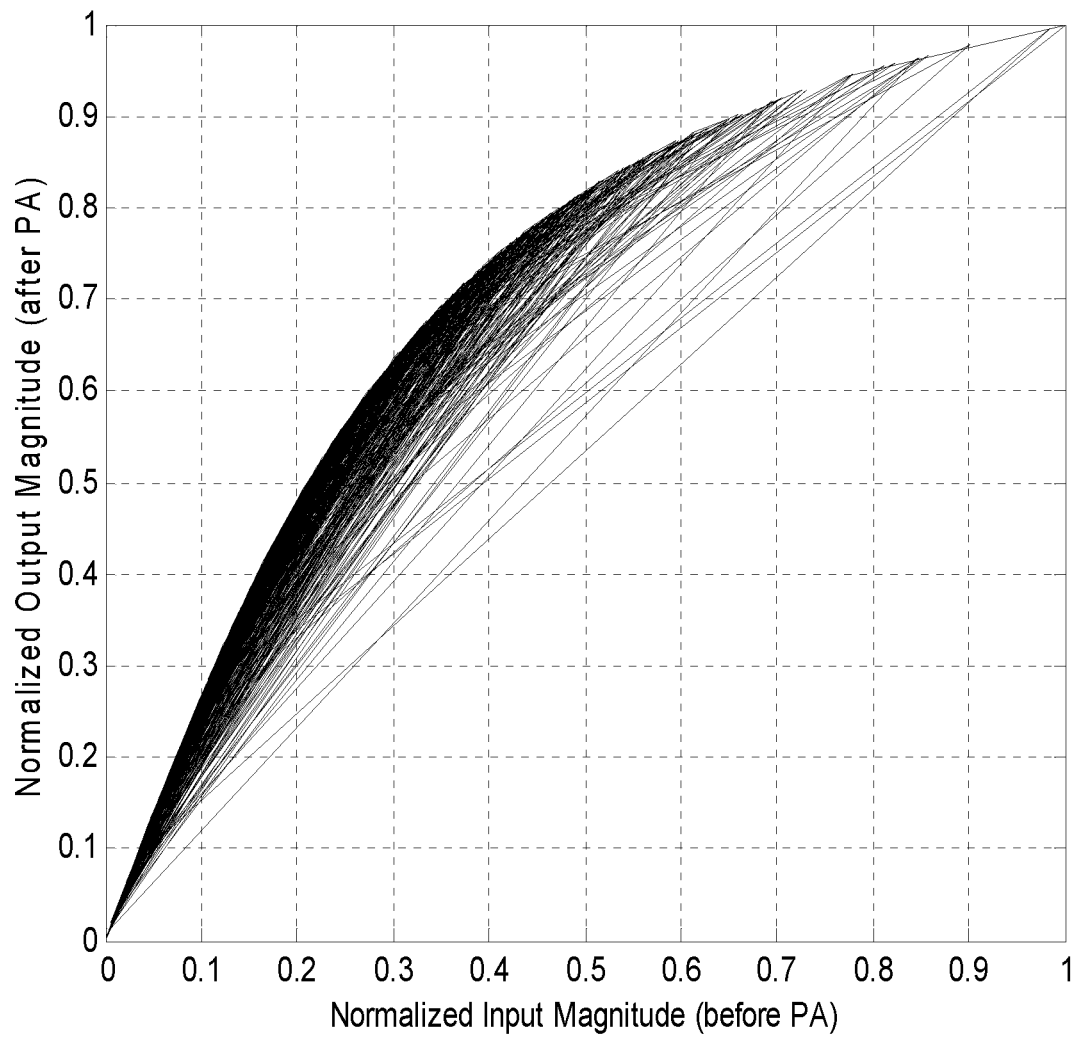
FIG. 1b is an illustration of an AM/AM performance of a power amplifier.
Figure 1C:
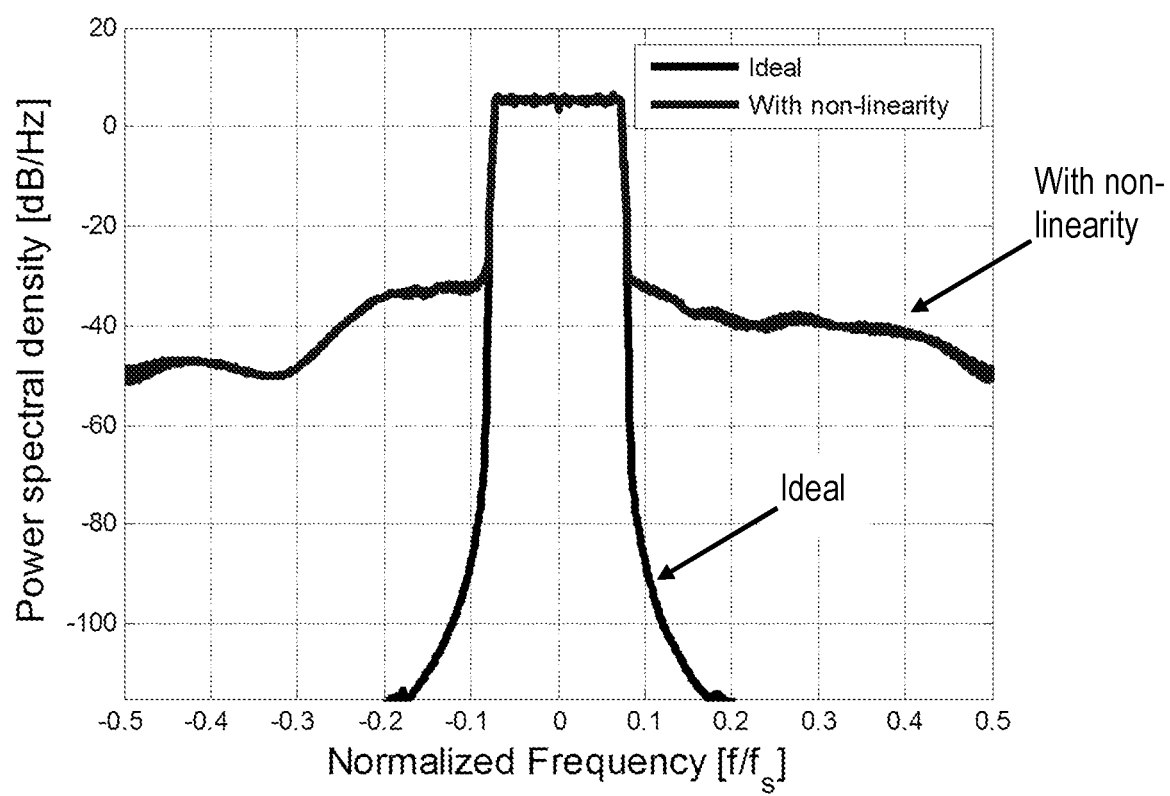
FIG. 1c is a graph of power spectral density of a power amplifier.
Figure 1D:
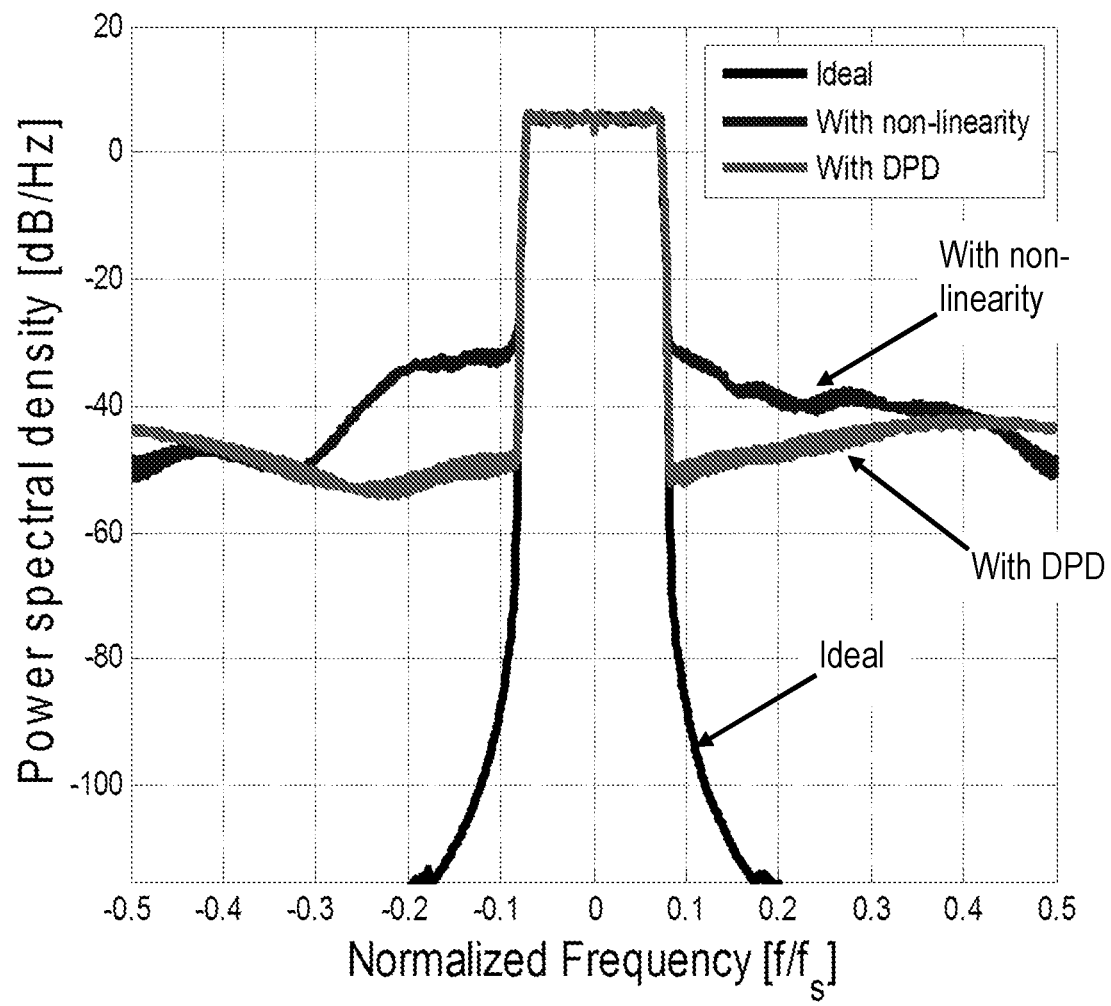
FIG. 1d is a graph of power spectral density of a power amplifier and Digital Pre-Distortion, DPD.
Figure 1E:
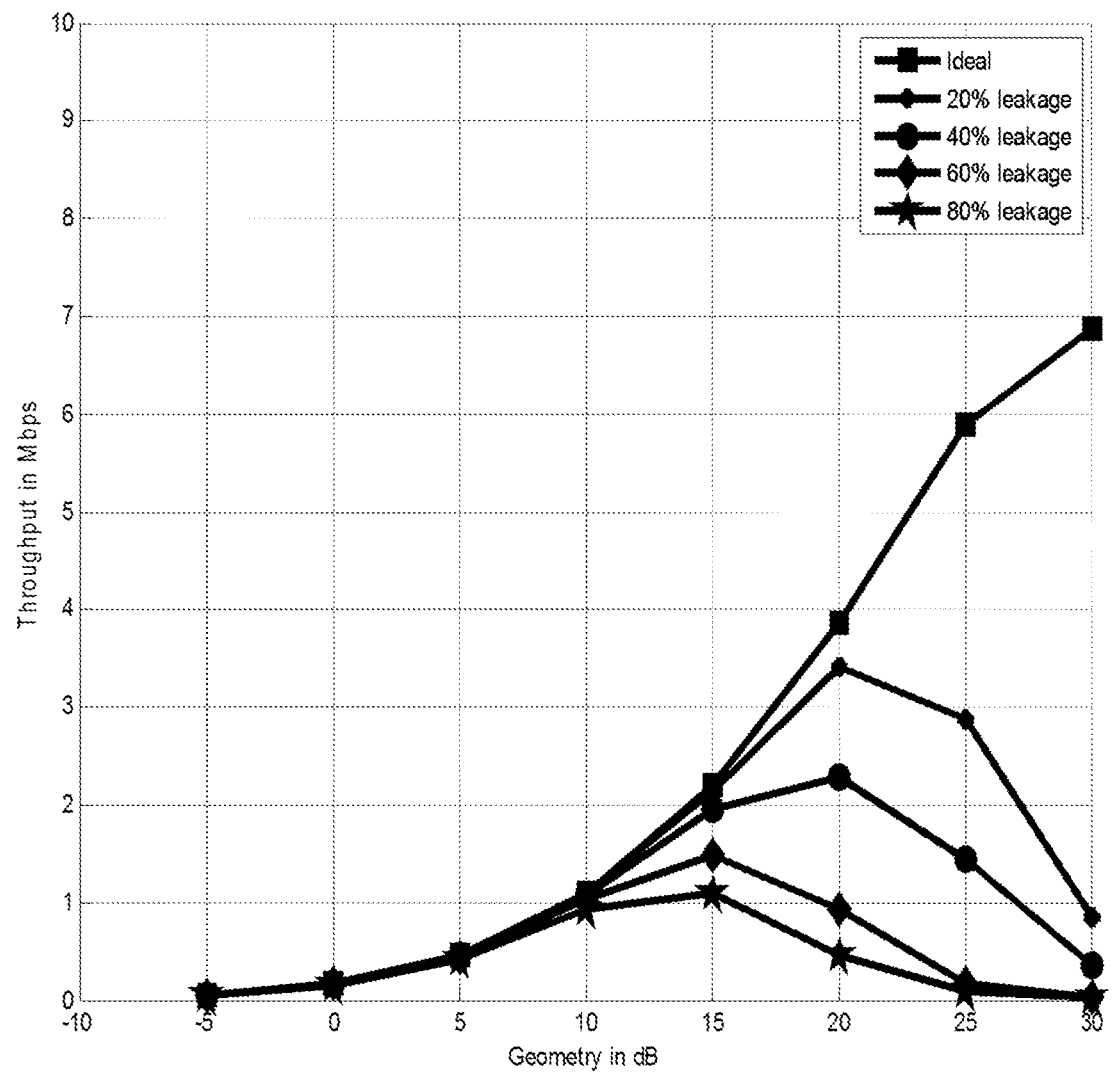
FIG. 1e is a graph illustrating link throughput in Mbps as a function of geometry with power leakage.
Figure 2A:
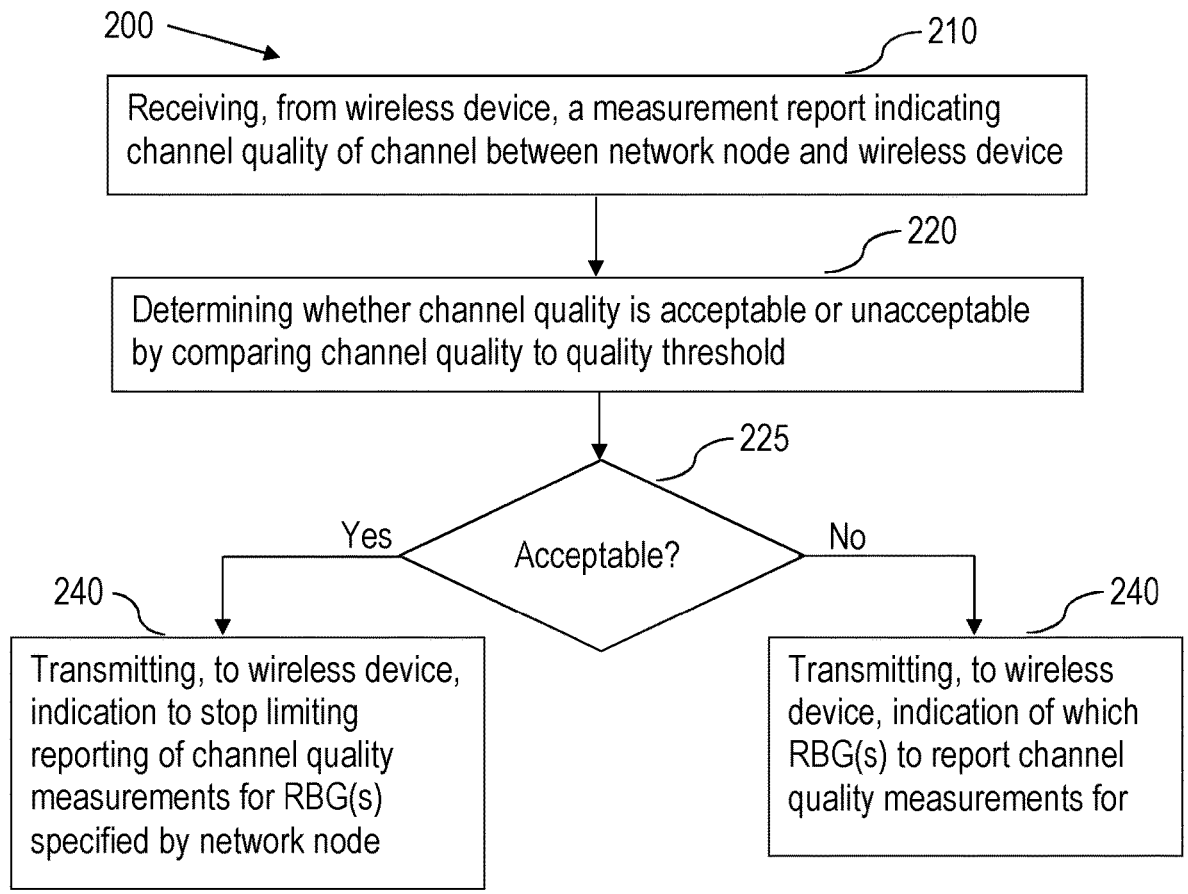
FIG. 2a is a flowchart of a method performed by a network node for communicating with a wireless device, according to an exemplifying embodiment.

FIG. 2a illustrates the method 200 comprising receiving 210, from the wireless device, a measurement report indicating a channel quality of the channel between the network node and the wireless device; and determining 220 whether the channel quality is acceptable or unacceptable. The method further comprises transmitting 240, to the wireless device, an indication of which RBG(s) to report channel quality measurements for, when the channel quality is unacceptable.

The wireless device performs different measurements on the channel quality for different purposes. One purpose is to inform the network node about the channel conditions so that the network node may take appropriate actions. Merely as an example, the information on channel quality may be used by the network node to select/determine a Modulation and Coding Scheme, MCS. Another example of a possible purpose for the wireless device to perform different measurements is mobility and handover. Once the wireless device has performed the measurement of the channel quality of the channel between the network node and the wireless device, the wireless device reports the measurements to the network node by sending a measurement report. The network node thus receives the measurement reports and thereby obtains information about the channel quality. The channel quality may be measured in different ways, for example pathloss, gain, geometry and Signal to Interference and Noise Ratio, SINR, just to mention some non-limiting examples.

Based on the measurement report, the network node determines whether the channel quality is acceptable or unacceptable. Examples of what may be acceptable and/or unacceptable will be given below.

In case the channel conditions are unacceptable, the network node may take different measures in order to improve the throughput on the channel. When the channel conditions are unacceptable, the network node transmits the indication of which RBG(s) to report channel quality measurements for to the wireless device.

The RBGs may be contiguous and the RBGs that are excluded for reporting quality measurements for are the ones that are most likely to cause leakage to other frequency band(s), which frequency band(s) is/are generally adjacent to the frequency band of the channel between the network node and the wireless device.

The method performed by the network node has several advantages. One possible advantage is that it provides increased flexibility to the network node for scheduling the wireless device in frequency bands, RBGs, that may improve throughput on the channel between the network node and the wireless device.

Determining 220 whether the channel quality is acceptable or unacceptable may comprise comparing the channel quality to a quality threshold.

When the network node determines whether the channel quality is acceptable or unacceptable, the network node may compare the channel quality, as received in the measurement report from the wireless device, to a quality threshold. Depending on how the channel quality is measured, e.g. pathloss, gain, geometry, SINR or SNR, the quality threshold may be represented by different values which are in accordance with the pathloss, gain, geometry, SINR or SNR.

Depending on the relationship between the channel quality and the quality threshold, the network node determines if the channel quality is acceptable or unacceptable. Merely as an illustrative example, if the channel quality is represented by SINR, then an acceptable channel quality should be equal to or above the quality threshold and when the channel quality is below the quality threshold, the channel quality is unacceptable.

Figure 2B:
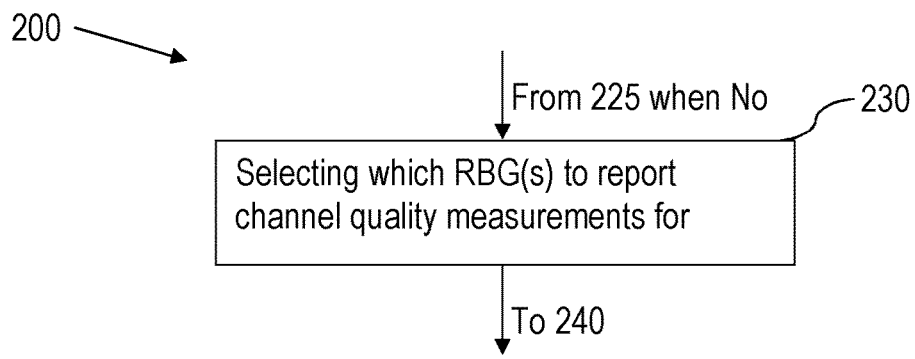
FIG. 2b is a flowchart of a method performed by a network node for communicating with a wireless device, according to another exemplifying embodiment.

The method may further comprise, as illustrated in FIG. 2b, selecting 230 which RBG(s) to be included in the indication of which RBG(s) to report channel quality measurements for, when the channel quality is unacceptable.

The network node may select which RBG(s) to be included in the indication of which RBG(s) to report channel quality measurements for, or analogously which RBG(s) that should be excluded. Different RBGs are more or less likely to cause leakage to other frequency band(s).

As described above, channel leakage is due to non-linear power amplifier(s). The channel leakage may more or less severely affect the throughput of the channel. In order to minimise the impact of the channel leakage, the network node may select RBG(s) to be included in the indication of which RBG(s) to report channel quality measurements for based on which RBG(s) that are most likely to not cause leakage to other frequency band(s).

In an example, the measurement report indicating the channel quality channel quality comprises a wideband Channel Quality Indicator, CQI.

There are different types of measurements the wireless device may perform on the channel between itself and the network node. One example is CQI. There are further different types of CQI, periodic and aperiodic. Further, the granularity of CQI report may be divided into three levels: wideband CQI, wireless device selected subband, and higher layer configured subband. The wideband report provides one CQI value for the entire downlink system bandwidth. The UE selected subband CQI report divides the system bandwidth into multiple subbands, selects a set of preferred subbands (the best M subbands), then reports one CQI value for the wideband and one differential CQI value for the set (assume transmission only over the selected M subbands). The higher layer configured subband report provides the highest granularity. It divides the entire system bandwidth into multiple subbands, then reports one wideband CQI value and multiple differential CQI values, one for each subband. Thus, one example of the measurement report indicating the channel quality channel quality comprises the wideband CQI.

The RBGs to report channel quality measurements for may exclude at least the first RBG and the last RBG at the frequency band edges of the bandwidth of the channel.

Since the channel leakage causes leakages of signals into adjacent frequency bands, the network node excludes at least the first RBG and the last RBG at the frequency band edges of the bandwidth of the channel. Merely as an illustrative example, assume the channel comprises eight RBGs RBG1, RBG2, RBG3, . . . , RBG8. Then RBG1 and RBG8 are the RBGs at the frequency band edges of the bandwidth of the channel. Further, assuming the frequencies in RBG1 is lower than the frequencies in RBG8, then at least RBG1 is likely to cause leakage to the adjacent channel of lower frequencies than the channel between the network node and the wireless device. Analogously, at least RBG8 is likely to cause leakage to the adjacent channel of higher frequencies than the channel between the network node and the wireless device.

Consequently, by excluding at least the first RBG and the last RBG at the frequency band edges of the bandwidth of the channel, i.e. RBG1 and RBG8 in the simplified and illustrative example above, the possible leakage into adjacent frequency bands is at least reduced.

The indication may be associated with a bitmap indicating which RBG(s) to report channel quality for and which RBGs to exclude.

By the bitmap indicates which RBG(s) to report channel quality for and which RBGs to exclude. The network node may transmit the bitmap itself as an indication of which RBG(s) to report channel quality measurements for; or the bitmap may have previously been transmitted to the wireless device and the indication just informs the wireless device that the wireless device should use the bitmap and may no longer report CQI on RBGs that are selected by the wireless device itself. The bitmap may be static, semi-static or dynamic. The bitmap may e.g. be transmitted to the wireless device once and thereafter the network node may indicate, to the wireless device, whether to use the bitmap or nor depending on the channel quality. Alternatively, the bitmap may be updated relatively seldom but at least it is updateable, wherein a new bitmap, or an update to the bitmap, may be transmitted to the wireless device. Still further, the bitmap may be updated regularly, when needed or per occasion it is to be used by the wireless device.

Figure 2C:
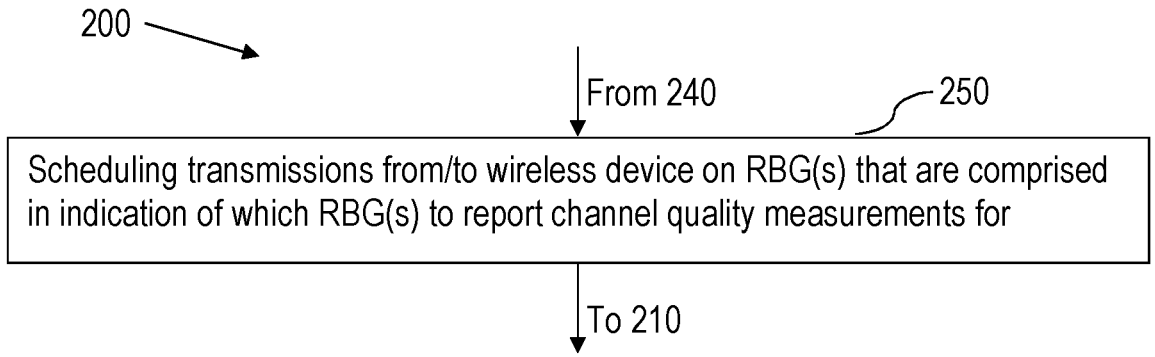
FIG. 2c is a flowchart of a method performed by a network node for communicating with a wireless device, according to yet an exemplifying embodiment.

The method may further comprise, as illustrated in FIG. 2c, scheduling 250 transmissions to the wireless device on the RBG(s) that are comprised in the indication of which RBG(s) to report channel quality measurements for.

When the wireless device may only report channel quality measurements for certain RBG(s), the network node may also choose to only schedule transmissions to the wireless device on those RBG(s) that the wireless device reports channel quality measurements for. Since signals transmitted on the RBGs at the frequency band edges may leak into adjacent frequency bands, those RBGs are also left unused on order to not deteriorate channel quality on adjacent frequency bands.

Consequently, when the subband restriction is active, meaning that the wireless device may not report channel quality measurements for certain RBG(s), the network node also restricts which RBGs it schedules transmissions to the wireless device on. When the subband restriction is not active, meaning the wireless device is not restricted to which RBGs to report channel quality measurements on, the network node may also schedule transmissions to the wireless device on any of the available RBGs of the channel between the network node and the wireless device.

According to an example, the network node may receive a measurement report indicating that the channel quality is acceptable during the time when subband restriction is active. In other words, the wireless device may only report channel quality measurements on RBG(s) in accordance with the above described bitmap, when the channel quality is good enough for being deemed acceptable. If so, the subband restriction is not needed anymore and then the network node may transmit a new indication to the wireless device, the new indication informing the wireless device to not use the bitmap any longer and that the wireless device is no longer restricted to report channel quality measurements on certain RBGs. The indication could alternatively comprise a new bitmap indicating that the wireless device may report channel quality measurements on any RBG(s) as selected by the wireless device itself. In other words, the network node leaves the selection of which RBGs to report channel quality measurements on to the discretion of the wireless device.

Embodiments herein also relate to a method performed by a wireless device for communicating with a network node, the wireless device and the network node being operable in a wireless communication network employing Orthogonal Frequency Division Multiplexing, OFDM technology. A channel between the network node and the wireless device comprises a set of RBGs. Embodiments of such a method will now be described with reference to FIGS. 3a and 3b.

Figure 3A:
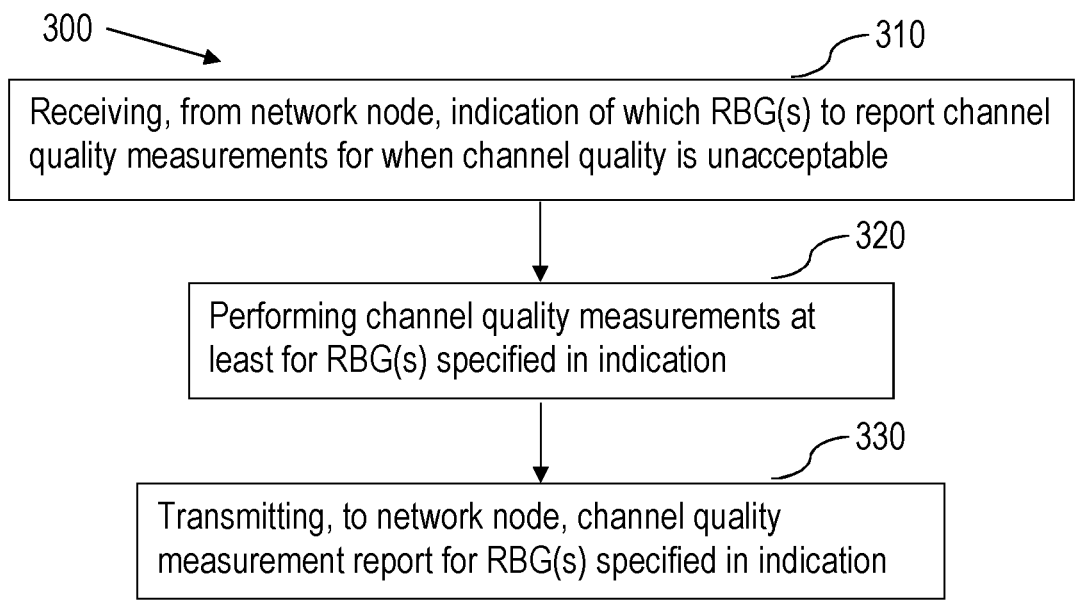
FIG. 3a is a flowchart of a method performed by a wireless device for communication with a network node, according to an exemplifying embodiment.

FIG. 3a illustrates the method comprising receiving 310, from the network node, an indication of which RBG(s) to report channel quality measurements for, when the channel quality is unacceptable, wherein the indication excludes at least the first and the last RBG at the frequency band edges. The method further comprises performing 320 a channel quality measurement at least for the RBG(s) specified in the indication; and transmitting 330, to the network node, a channel quality measurement report for the RBG(s) specified in the indication.

When the wireless device receives the indication indication of which RBG(s) to report channel quality measurements for, the wireless device may no longer select at free will which RBG(s) to report channel quality measurements for.

By receiving the indication, the wireless device is informed of at least which RBG(s) to exclude. The indication may alternatively, or additionally indicate which RBG(s) that the wireless device may select, or must select, for reporting channel quality measurements for. It may be that the wireless device may only need to report channel quality measurements on some of the not-excluded RBG(s). If so, the wireless device may choose freely among those not-excluded RBG(s), also referred to as allowed RBG(s). Alternatively, the wireless device should report channel quality measurements on all allowed RBGs.

The wireless device performs a measurement of the channel quality of the channel between itself and the network node. The measurement may be on all RBGs of the channel or only on (some or all of) those RBG(s) that are indicated as allowed.

Once the wireless device has performed the measurements, the wireless device sends a measurement report to the wireless device. Even if the wireless device has measured channel quality of all RBGs of the channel, it only reports channel quality measurements on allowed RBGs. In other words, the wireless device does not report channel quality measurements for those RBG(s) that is/are excluded by means of the received indication from the network node.

The method performed by the wireless device has several advantages. One possible advantage is that it provides increased flexibility to the network node for scheduling the wireless device in frequency bands, RBGs, that may improve throughput on the channel between the network node and the wireless device.

In an example, the indication is associated with a bitmap indicating which RBG(s) to report channel quality for and which RBGs to exclude.

As described above, the bitmap indicates which RBG(s) to report channel quality for and which RBGs to exclude. The network node may transmit the bitmap itself as an indication of which RBG(s) to report channel quality measurements for; or the bitmap may have previously been transmitted to the wireless device and the indication just informs the wireless device that the wireless device should use the bitmap and may no longer report CQI on RBGs that are selected by the wireless device itself. The bitmap may be static, semi-static or dynamic. The bitmap may e.g. be transmitted to the wireless device once and thereafter the network node may indicate, to the wireless device, whether to use the bitmap or nor depending on the channel quality. Alternatively, the bitmap may be updated relatively seldom but at least it is updateable, wherein a new bitmap, or an update to the bitmap, may be transmitted to the wireless device. Still further, the bitmap may be updated regularly, when needed or per occasion it is to be used by the wireless device.

The measurement report indicating the channel quality channel quality may comprise a wideband CQI.

There are, also as described above, different types of measurements the wireless device may perform on the channel between itself and the network node whereof one example of the measurement report indicating the channel quality channel quality comprises the wideband CQI.

Figure 3B:
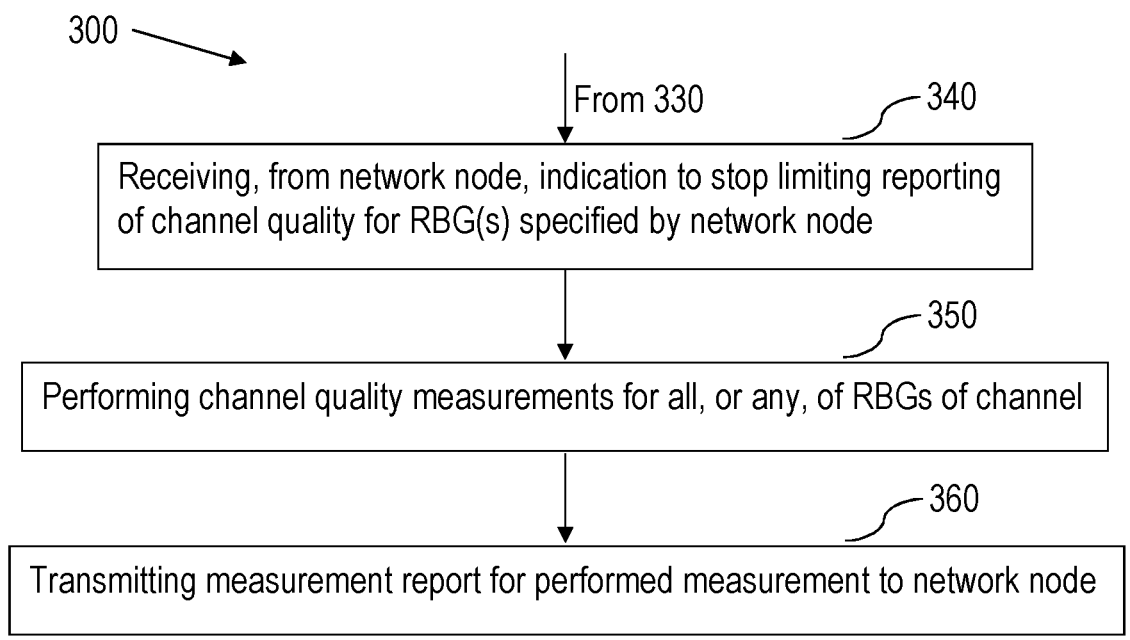
FIG. 3b is a flowchart of a method performed by a wireless device for communication with a network node, according to yet an exemplifying embodiment.

The method may further comprise, as illustrated in FIG. 3b, when the wireless device is currently reporting channel quality measurements for RBG(s) specified by the network node, receiving 340, from the network node, an indication to stop limiting the reporting of channel quality for the RBG(s) specified by the network node; performing 350 a channel quality measurement for all, or any, RBGs of the channel; and transmitting 360 a measurement report for the performed measurements to the network node.

By the received indication to stop limiting the reporting of channel quality for the RBG(s) specified by the network node, the wireless device is free to choose which RBG(s) of the channel to report channel measurements for. The wireless device may select all of the available RBGs of the channel or all of the RBGs of the channel to report CQI for.

The wireless device thus performs a channel quality measurement on all of the available RBGs of the channel, or on any of the RBGs of the channel chosen at its own discretion. The wireless device the transmits the measurement report for the performed measurements to the network node.

The network node may be any type of network node serving the wireless device and/or connected to other network node or network element or any radio node from where the wireless device receives signal(s). Examples of radio network nodes are Node B (NB), evolved NB (eNB), base station, Multi-Standard Radio node such as MSR BS, network controller, Radio Network Controller (RNC), Base Station Controller (BSC), relay, donor node controlling relay, Base Transceiver Station (BTS), Access Point (AP), Transmission Points, transmission nodes, Remote Radio Unit (RRU), remote Radio Head (RRH), nodes in Distributed Antenna System (DAS) system, etc.

The wireless device may refer to any type of wireless device communicating with a radio network node in a cellular or mobile communication system. Examples of a wireless device are target device, User Equipment (UE), Device to Device (D2D), Machine Type Communication (MTC) or UE capable of Machine to Machine (M2M) communication, Personal Digital Assistant (PDA), iPAD, Tablet, mobile terminals, smart phone, Laptop Embedded Equipped (LEE), Laptop Mounted Equipment (LME), USB dongles etc.

The embodiments are applicable to single carrier as well as to multicarrier or carrier aggregation operation of the wireless device in conjunction with MIMO in which the wireless device is able to receive and/or transmit data to more than one serving cells using MIMO. The term carrier aggregation is also called (e.g. interchangeably called) "multi-carrier system", "multi-cell operation", "multi-carrier operation", "multi-carrier" transmission and/or reception.

The network node may send a bitmap or an indication associated with the bitmap to the wireless device indicating not to send channel quality measurement reports on certain band locations (usually at the edges) to avoid the power leakage problem. Once the network node receives the channel quality measurement reports on the specified bands from the wireless device, the network node schedules the wireless device only on those bands where the channel quality information is reported, thereby avoiding, or reducing, the leakage problem.

For example, assume the wireless device is configured with an OFDM system with bandwidth equal to 10 MHz, that is 50 resource blocks, where each resource block contains 12 sub carriers of bandwidth of 15 KHz. The carriers are grouped into resource block groups of e.g. 5

Figures 4A, 4B:
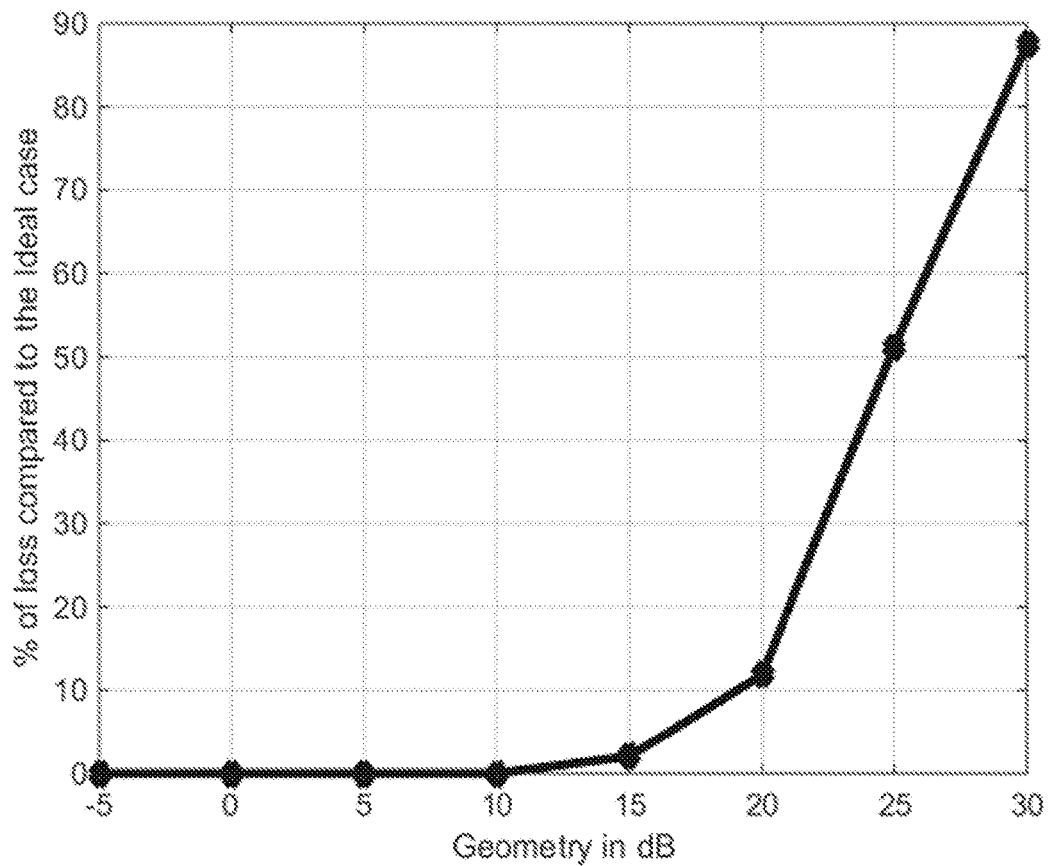
FIG. 4a is a schematic example of a subband restriction bitmap.
FIG. 4b is a graph illustrating a percentage of loss in link throughput in Mbps as a function of geometry with power leakage.

(cluster or consecutive carriers). This means the OFDM system may be divided into 10 resource block groups (RBG). Then according to the solution disclosed herein, the network node may send a bit map of 10 bit as illustrated in FIG. 4a. Where the setting up of bit equal to 0 means that the network node is barring those band locations where the bit is set to 0. Once the wireless device receives the bit map, it interprets that the band locations or RBG 1 and 10 are prohibited, there by does not send the channel quality information measurements on these particular bands in the channel quality reporting.

The bitmap may be sent either during cell set up or once the wireless device is connected to the network node. The bitmap may be sent semi-statically or dynamically. Note that semi-static configuration requires less overhead as compared to the dynamic signalling. The network node may send the bitmap on per wireless device basis, based on e.g. path loss, or the channel quality measurements from the wireless device.

The exclusion of RBGs at the frequency band edges for all the wireless devices might cause a reduction in the bandwidth of the system. Reverting to the illustrative example in FIG. 4a, out of 10 RBGs, only 8 are used. This might reduce the throughput/total system capacity of the cell. Hence to avoid this problem, the network node may send the bit map based on the location of the wireless device or long term SINR for the wireless device. The motivation for the proposed location or long term SINR based band subset restriction bit map is that the percentage of degradation of the throughput for a given power leakage is severe at high SINR or low path loss or the cell center. FIG. 4b shows the percentage of degradation with a power leakage of 20% as function of geometry or long term SINR. It can be observed that there is no loss when the geometry is less than 15 dB, however there is significant degradation in throughput when the geometry is more than 15 dB and the penalty is severe when the geometry is at 30 dB. Hence the network may send the band subset restriction bit map when the wireless device is at high SINR or geometry. The geometry or SINR is a function of path loss, related to path loss as:

$$\text{pathloss} = F\left(\frac{1}{\text{Geometry}}\right).$$

Figure 4C:
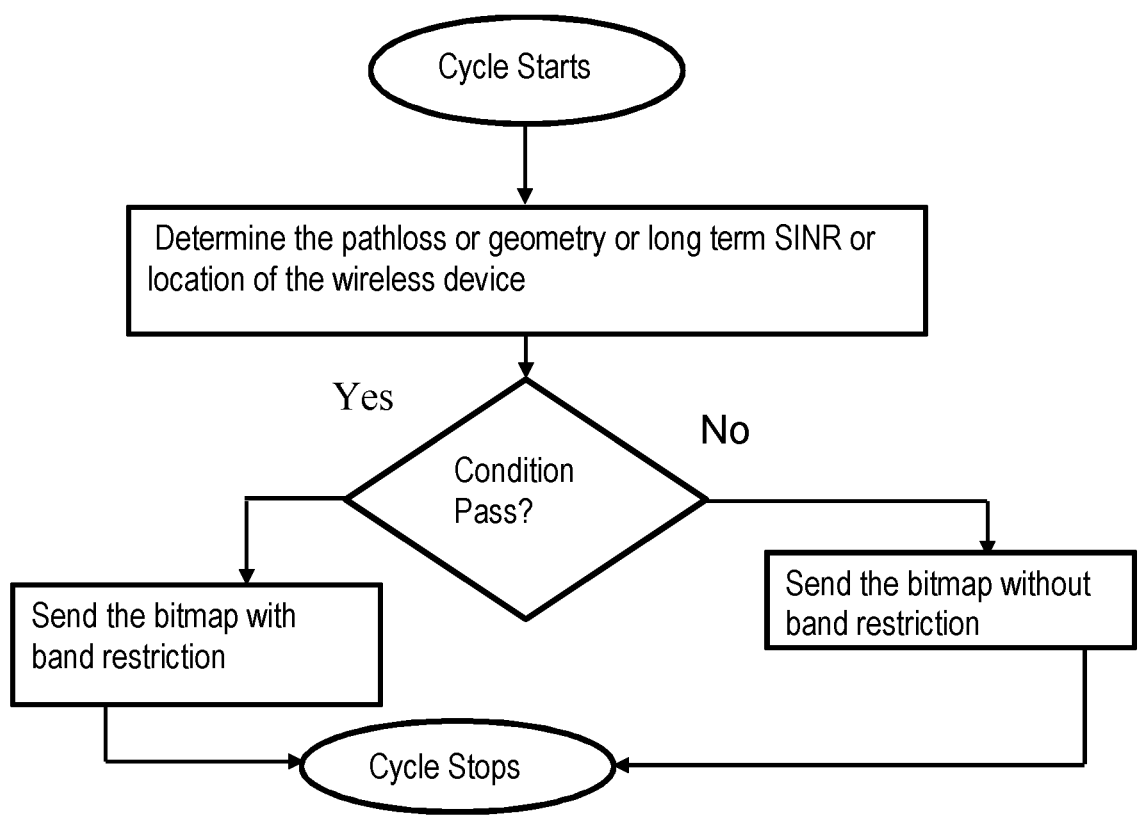
FIG. 4c is a flowchart schematically illustrating an example of the method performed by the network node.

FIG. 4c is a flowchart schematically illustrating an example of the method performed by the network node. In the flowchart, the geometry of the wireless device is denoted by G, then the condition pass means, $G > G_{th}$, where $G_{th}$ is the geometry threshold. Note that there are many ways to compute the geometry of the wireless device, for example from downlink measurements or from uplink measurements. Further, the long term SINR, and the condition pass means $SINR > SINR_{th}$, where $SINR_{th}$ is the long term SINR. Note that there are many ways to compute the long term SINR of the wireless device, for example by averaging out the wireless device reported CQI gives a measure of SINR. An example of a value of the SINR threshold, also referred to as a quality threshold above, is 15 dB.

Figure 4D:
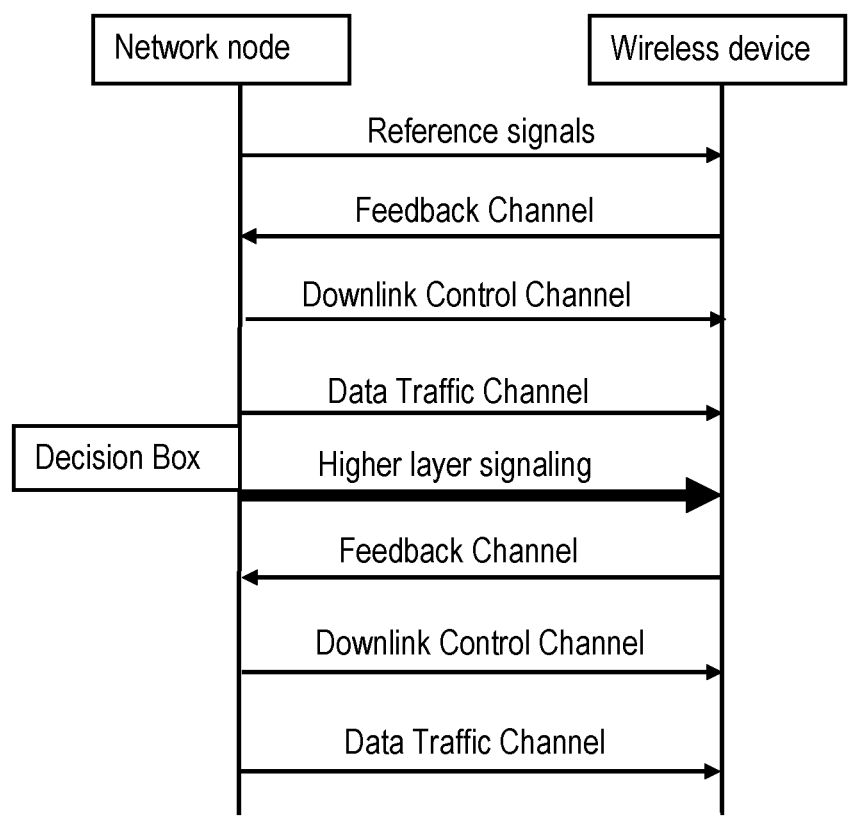
FIG. 4d is a message sequence chart with higher layer signalling about the subband restriction bitmap.

Once the network node determines which bits needs to set in the band subset restriction bitmap, the network node needs to communicate this bitmap to the wireless device. FIG. 4d illustrates an example of a message sequence chart with higher layer signalling, e.g. Radio Resource Control, RRC, signalling. Assume that the network node is receiving the channel quality information using a conventional feedback channel. The network node periodically checks the selection criteria as described above, and if this is a pass (see FIG. 4c) it sends a higher order signalling to the wireless device thereby the wireless device sends channel quality measurement reports according to the bits set in the band subset restriction, see e.g. FIG. 4a.

Figure 4E:
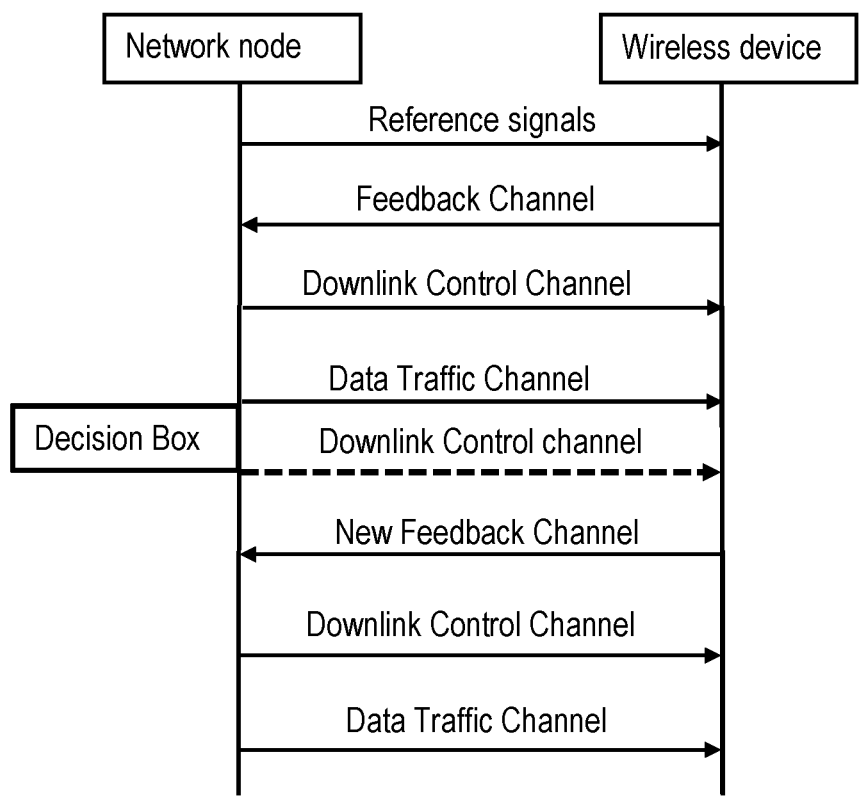
FIG. 4e is a message sequence chart with physical layer signalling about the subband restriction bitmap.

Another example of how the network node may transmit the indication associated with the bitmap, or the bitmap itself is illustrated in FIG. 4e. In FIG. 4e, the network node transmits the band subset restriction bitmap using physical layer signalling. This example may be useful as it reduces the latency compared to the higher layer signalling, however requires dynamic resources to indicate to the wireless device.

Assume that initially the wireless device sends the feedback using conventional feedback channel. Say after few Transmission Time Intervals, TTIs, the network node checks the criteria. If the criterion is a pass then it sends the signalling through downlink control channel (or a new Layer 1 channel) to indicate for which bands the wireless device should report the channel quality measurements. Note that this message may be sent using a separate field in the downlink control channel or by using an unused combination in the downlink control channel.

The wireless device needs to understand that the network does not prefer the certain bands (which e.g. are set to zero in the bitmap) for channel quality information reporting. Hence the wireless device may compute the CQI, the Rank Indicator, RI, and Pre-coding Matrix Indicator, PMI over the bands which are set to one and indicates to the network the preferred band locations, the preferred PMI, RI, and CQI corresponding each codeword.

Figure 4F:
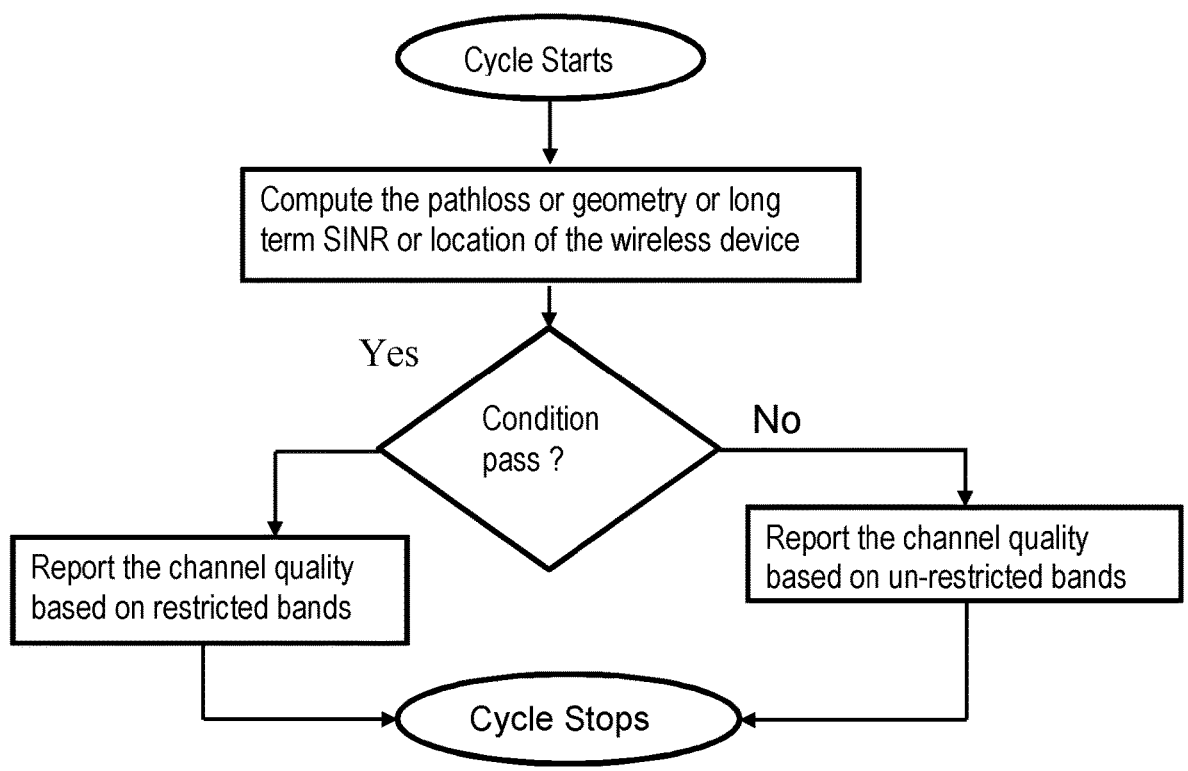
FIG. 4f is a flowchart of a method performed by a wireless device.

An alternative solution is schematically illustrated in FIG. 4f. In this alternative solution, the wireless device may decide on its own, as opposed to the network node deciding and sending the indication/bitmap as described above. In the alternative solution illustrated in FIG. 4f, the wireless device determines on its own whether to restrict the RBG(s) channel quality information reporting based on certain conditions, and reports the channel quality information only on certain bands, RBGs, thereby avoiding the power leakage of certain bands.

Assume geometry of the wireless device is denoted by G, then the condition pass means, $G > G_{th}$, where $G_{th}$ is the geometry threshold. Note that there are many ways to compute the geometry of the wireless device, for example from downlink measurements. Assume further that the long term SINR is denoted by SINR, then the condition pass means $SINR > SINR_{th}$, where $SINR_{th}$ is the long term SINR. Note that there are many ways to compute the long term SINR of the wireless device, for example by averaging out the CQI measurement gives a measure of SINR.

Embodiments herein also relate to a network node for communicating with a wireless device. The network node has the same technical features, objects and advantages as the method performed by the network node. The network node will only be described in brief in order to avoid unnecessary repetition.

Figure 5:
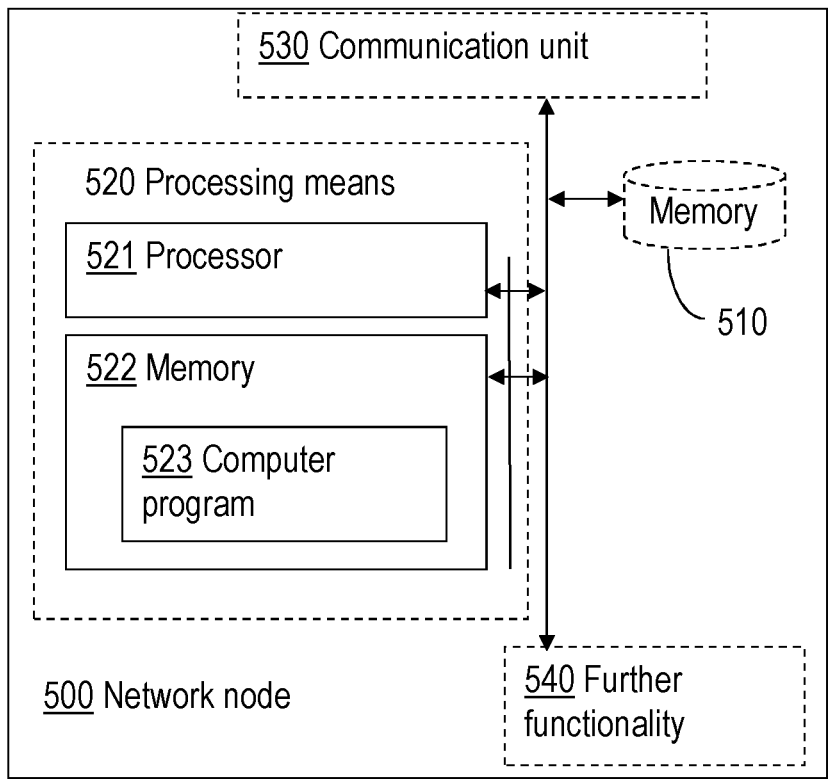
FIG. 5 is a block diagram of a network node for communicating with a wireless device according to an exemplifying embodiment.
Figure 6:
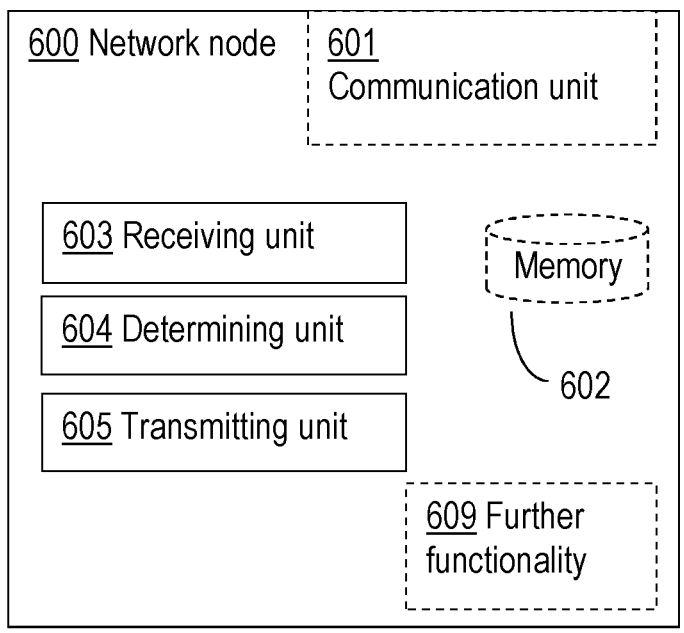
FIG. 6 is a block diagram of a network node for communicating with a wireless device according to another exemplifying embodiment.

The network node will be described with reference to FIGS. 5 and 6. Both FIG. 5 and FIG. 6 are block diagram of embodiments of the network node for communicating with a wireless device. The network node and the wireless device are operable in a wireless communication network employing OFDM technology, wherein a channel between the network node and the wireless device comprises a set of RBGs.

FIGS. 5 and 6 illustrate the network node 500, 600 being configured for receiving, from the wireless device, a measurement report indicating a channel quality of the channel between the network node and the wireless device; and determining whether the channel quality is acceptable or unacceptable. The network node 500, 600 is further configured for transmitting, to the wireless device, an indication of which RBG(s) to report channel quality measurements for, when the channel quality is unacceptable.

The network node 500, 600 may be realised or implemented in various different ways. A first exemplifying implementation or realisation is illustrated in FIG. 5. FIG. 5 illustrates the network node 500 comprising a processor 521 and memory 522, the memory comprising instructions, e.g. by means of a computer program 523, which when executed by the processor 521 causes the network node 500 to receive, from the wireless device, a measurement report indicating a channel quality of the channel between the network node and the wireless device. The memory further comprises instructions, which when executed by the processor 521 causes the network node 500 to determine whether the channel quality is acceptable or unacceptable; and to transmit, to the wireless device, an indication of which RBG(s) to report channel quality measurements for, when the channel quality is unacceptable.

FIG. 5 also illustrates the network node 500 comprising a memory 510. It shall be pointed out that FIG. 5 is merely an exemplifying illustration and memory 510 may be optional, be a part of the memory 522 or be a further memory of the network node 500. The memory may for example comprise information relating to the network node 500, to statistics of operation of the network node 500, just to give a couple of illustrating examples. FIG. 5 further illustrates the network node 500 comprising processing means 520, which comprises the memory 522 and the processor 521. Still further, FIG. 5 illustrates the network node 500 comprising a communication unit 530. The communication unit 530 may comprise an interface through which the network node 500 communicates with other nodes or entities of the communication network as well as other communication units. FIG. 5 also illustrates the network node 500 comprising further functionality 540. The further functionality 540 may comprise hardware of software necessary for the network node 500 to perform different tasks that are not disclosed herein.

An alternative exemplifying implementation of the network node 500, 600 is illustrated in FIG. 6. FIG. 6 illustrates the network node 600 comprising a receiving unit 603 for receiving, from the wireless device, a measurement report indicating a channel quality of the channel between the network node and the wireless device. The network node 600 further comprises a determining unit 604 for determining whether the channel quality is acceptable or unacceptable; and a transmitting unit 605 for transmitting, to the wireless device, an indication of which RBG(s) to report channel quality measurements for, when the channel quality is unacceptable.

In FIG. 6, the network node 600 is also illustrated comprising a communication unit 601. Through this unit, the network node 600 is adapted to communicate with other nodes and/or entities in the wireless communication network. The communication unit 601 may comprise more than one receiving arrangement. For example, the communication unit 601 may be connected to both a wire and an antenna, by means of which the network node 600 is enabled to communicate with other nodes and/or entities in the wireless communication network. Similarly, the communication unit 601 may comprise more than one transmitting arrangement, which in turn is connected to both a wire and an antenna, by means of which the network node 600 is enabled to communicate with other nodes and/or entities in the wireless communication network. The network node 600 is further illustrated comprising a memory 602 for storing data. Further, the network node 600 may comprise a control or processing unit (not shown) which in turn is connected to the different units 603-605. It shall be pointed out that this is merely an illustrative example and the network node 600 may comprise more, less or other units or modules which execute the functions of the network node 600 in the same manner as the units illustrated in FIG. 6.

It should be noted that FIG. 6 merely illustrates various functional units in the network node 600 in a logical sense. The functions in practice may be implemented using any suitable software and hardware means/circuits etc. Thus, the embodiments are generally not limited to the shown structures of the network node 600 and the functional units. Hence, the previously described exemplary embodiments may be realised in many ways. For example, one embodiment includes a computer-readable medium having instructions stored thereon that are executable by the control or processing unit for executing the method steps in the network node 600. The instructions executable by the computing system and stored on the computer-readable medium perform the method steps of the network node 600 as set forth in the claims.

The network node 500, 600 has the same possible advantages as the method performed by the network node. One possible advantage is that One possible advantage is that it provides increased flexibility to the network node for scheduling the wireless device in frequency bands, RBGs, that may improve throughput on the channel between the network node and the wireless device.

According to an embodiment, the network node is further configured for determining whether the channel quality is acceptable or unacceptable by comparing the channel quality to a quality threshold.

According to yet an embodiment, the network node is further configured for selecting which RBG(s) to be included in the indication of which RBG(s) to report channel quality measurements for, when the channel quality is unacceptable.

According to still an embodiment, the measurement report indicating the channel quality channel quality comprises a wideband CQI, According to another embodiment, the RBGs to report channel quality measurements for excludes at least the first RBG and the last RBG at the frequency band edges of the bandwidth of the channel.

According to a further embodiment, the indication is associated with a bitmap indicating which RBG(s) to report channel quality for and which RBGs to exclude.

According to yet an embodiment, the network node is further configured for scheduling transmissions to the wireless device on the RBG(s) that are comprised in the indication of which RBG(s) to report channel quality measurements for.

Embodiments herein also relate to a wireless device for for communicating with a network node. The wireless device and the network node are operable in a wireless communication network employing OFDM technology wherein a channel between the network node and the wireless device comprises a set of RBGs. The wireless device has the same technical features, objects and advantages as the method performed by the wireless device. The wireless device will only be described in brief in order to avoid unnecessary repetition.

The wireless device will be described with reference to FIGS. 7 and 8. Both FIG. 7 and FIG. 8 are block diagrams of embodiments of the wireless device for communicating with a network node.

Figure 7:
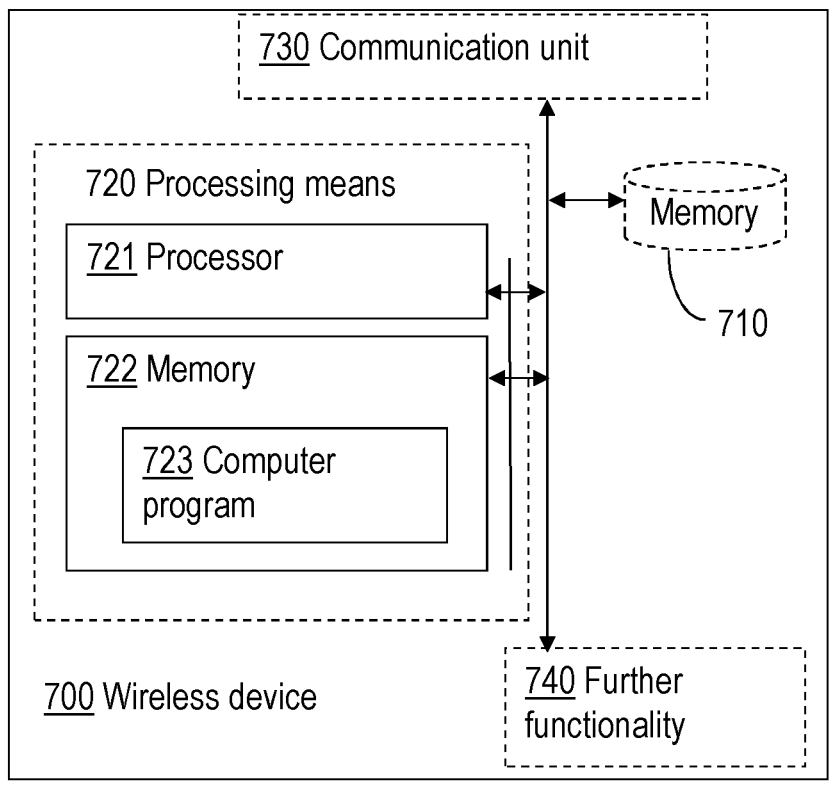
FIG. 7 is a block diagram of a wireless device for communicating with a network node according to an exemplifying embodiment.
Figure 8:
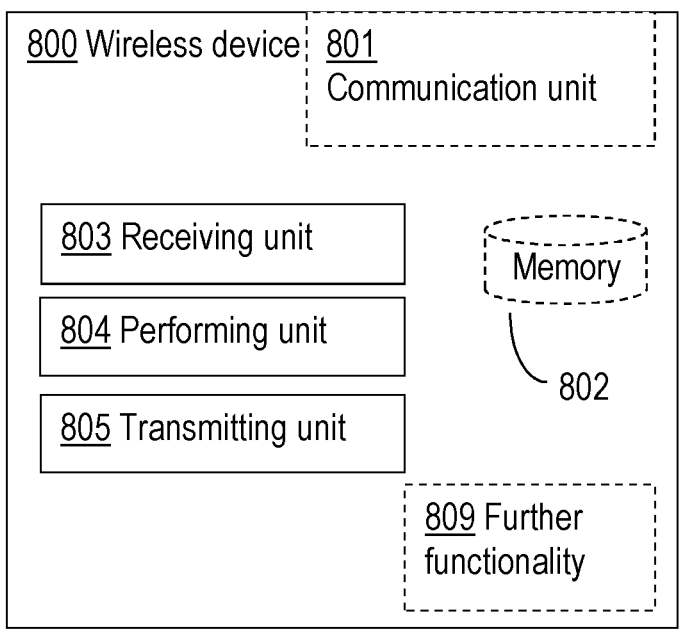
FIG. 8 is a block diagram of a wireless device for communicating with a network node according to another exemplifying embodiment.

FIGS. 7 and 8 illustrate the wireless device 700, 800 being configured for receiving, from the network node, an indication of which RBG(s) to report channel quality measurements for, when the channel quality is unacceptable, wherein the indication excludes at least the first and the last RBG at the frequency band edges. The wireless device 700, 800 is further configured for performing a channel quality measurement at least for the RBG(s) specified in the indication; and transmitting, to the network node, a channel quality measurement report for the RBG(s) specified in the indication.

The wireless device 700, 800 may be realised or implemented in various different ways. A first exemplifying implementation or realisation is illustrated in FIG. 7. FIG. 7 illustrates the wireless device 700 comprising a processor 721 and memory 722, the memory comprising instructions, e.g. by means of a computer program 723, which when executed by the processor 721 causes the wireless device 700 to receive, from the network node, an indication of which RBG(s) to report channel quality measurements for, when the channel quality is unacceptable, wherein the indication excludes at least the first and the last RBG at the frequency band edges. The memory further comprises instructions, which when executed by the processor 721 causes the wireless device 700 to perform a channel quality measurement at least for the RBG(s) specified in the indication; and to transmit, transmitting, to the network node, a channel quality measurement report for the RBG(s) specified in the indication.

FIG. 7 also illustrates the wireless device 700 comprising a memory 710. It shall be pointed out that FIG. 7 is merely an exemplifying illustration and memory 710 may be optional, be a part of the memory 722 or be a further memory of the wireless device 700. The memory may for example comprise information relating to the wireless device 700, to statistics of operation of the wireless device 700, just to give a couple of illustrating examples. FIG. 7 further illustrates the wireless device 700 comprising processing means 720, which comprises the memory 722 and the processor 721. Still further, FIG. 7 illustrates the wireless device 700 comprising a communication unit 730. The communication unit 730 may comprise an interface through which the wireless device 700 communicates with other nodes or entities of the communication network as well as other communication units. FIG. 7 also illustrates the wireless device 700 comprising further functionality 740. The further functionality 740 may comprise hardware of software necessary for the wireless device 700 to perform different tasks that are not disclosed herein.

An alternative exemplifying implementation of the wireless device 700, 800 is illustrated in FIG. 8. FIG. 8 illustrates the wireless device 800 comprising a receiving unit 803 for receiving, from the network node, an indication of which RBG(s) to report channel quality measurements for, when the channel quality is unacceptable, wherein the indication excludes at least the first and the last RBG at the frequency band edges; and a performing unit 804 performing a channel quality measurement at least for the RBG(s) specified in the indication. The wireless device 800 is also illustrated comprising a transmitting unit 805 for transmitting, to the network node, a channel quality measurement report for the RBG(s) specified in the indication.

In FIG. 8, the wireless device 800 is also illustrated comprising a communication unit 801. Through this unit, the wireless device 800 is adapted to communicate with other nodes and/or entities in the wireless communication network. The communication unit 801 may comprise more than one receiving arrangement. For example, the communication unit 801 may be connected to both a wire and an antenna, by means of which the wireless device 800 is enabled to communicate with other nodes and/or entities in the wireless communication network. Similarly, the communication unit 801 may comprise more than one transmitting arrangement, which in turn is connected to both a wire and an antenna, by means of which the wireless device 800 is enabled to communicate with other nodes and/or entities in the wireless communication network. The wireless device 800 is further illustrated comprising a memory 802 for storing data. Further, the wireless device 800 may comprise a control or processing unit (not shown) which in turn is connected to the different units 803-805. It shall be pointed out that this is merely an illustrative example and the wireless device 800 may comprise more, less or other units or modules which execute the functions of the wireless device 800 in the same manner as the units illustrated in FIG. 8.

It should be noted that FIG. 8 merely illustrates various functional units in the wireless device 800 in a logical sense. The functions in practice may be implemented using any suitable software and hardware means/circuits etc. Thus, the embodiments are generally not limited to the shown structures of the wireless device 800 and the functional units. Hence, the previously described exemplary embodiments may be realised in many ways. For example, one embodiment includes a computer-readable medium having instructions stored thereon that are executable by the control or processing unit for executing the method steps in the wireless device 800. The instructions executable by the computing system and stored on the computer-readable medium perform the method steps of the wireless device 800 as set forth in the claims.

The wireless device 700, 800 has the same possible advantages as the method performed by the wireless device. One possible advantage is that One possible advantage is that it provides increased flexibility to the network node for scheduling the wireless device in frequency bands, RBGs, that may improve throughput on the channel between the network node and the wireless device.

According to an embodiment, the indication is associated with a bitmap indicating which RBG(s) to report channel quality for and which RBGs to exclude.

According to yet an embodiment, the measurement report indicating the channel quality channel quality comprises a CQI.

According to still an embodiment, the wireless device 700, 800 is further configured for, when the wireless device is currently reporting channel quality measurements for RBG(s) specified by the network node, receiving, from the network node, an indication to stop limiting the reporting of channel quality for the RBG(s) specified by the network node; performing a channel quality measurement for all, or any, RBGs of the channel; and transmitting a measurement report for the performed measurements to the network node.

Figure 9:
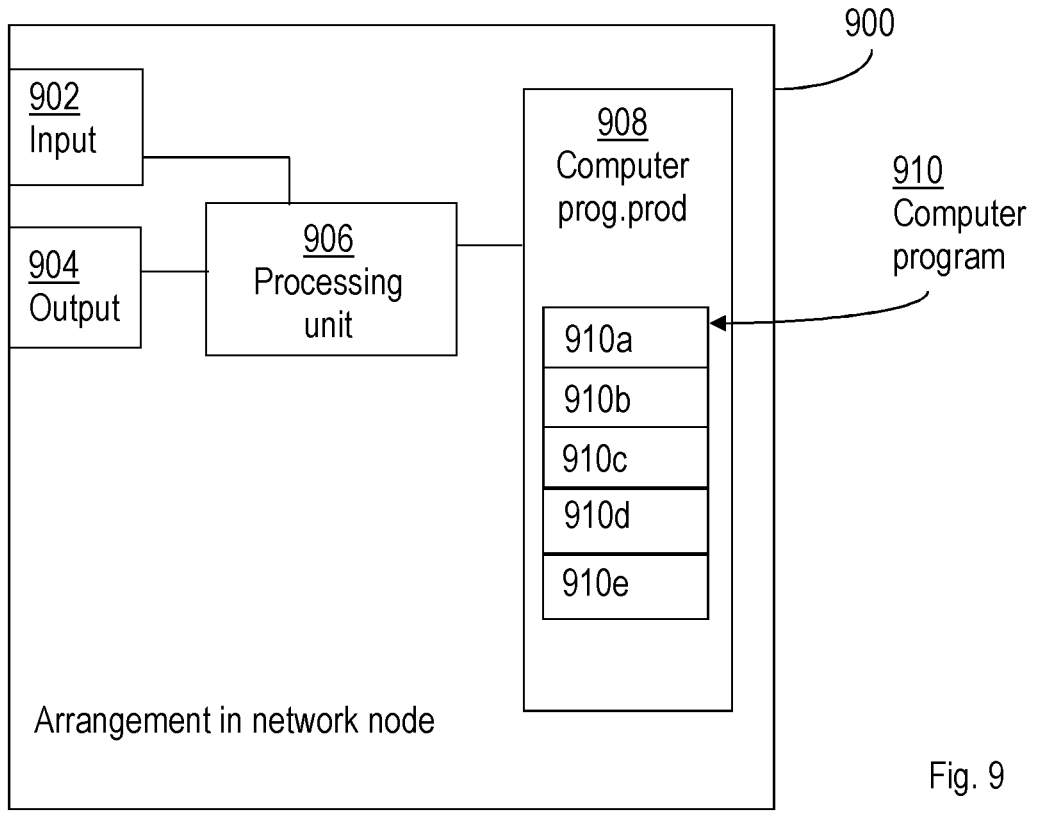
FIG. 9 is a block diagram of an arrangement in a network node for communicating with a wireless device according to an exemplifying embodiment.

FIG. 9 schematically shows an embodiment of an arrangement 1100 in a network node 600. Comprised in the arrangement 1100 in the network node 600 are here a processing unit 1106, e.g. with a Digital Signal Processor, DSP. The processing unit 1106 may be a single unit or a plurality of units to perform different actions of procedures described herein. The arrangement 1100 of the network node 600 may also comprise an input unit 1102 for receiving signals from other entities, and an output unit 1104 for providing signal(s) to other entities. The input unit and the output unit may be arranged as an integrated entity or as illustrated in the example of FIG. 6, as one or more interfaces 601.

Furthermore, the arrangement 1100 in the network node 600 comprises at least one computer program product 1108 in the form of a non-volatile memory, e.g. an Electrically Erasable Programmable Read-Only Memory, EEPROM, a flash memory and a hard drive. The computer program product 1108 comprises a computer program 1110, which comprises code means, which when executed in the processing unit 1106 in the arrangement 1100 in the network node 600 causes the network node to perform the actions e.g. of the procedure described earlier in conjunction with FIGS. 2a-2c.

The computer program 1110 may be configured as a computer program code structured in computer program modules 1110a-1110e. Hence, in an exemplifying embodiment, the code means in the computer program of the arrangement 1100 in the network node 600 comprises a receiving unit, or module, for receiving, from the wireless device, a measurement report indicating a channel quality of the channel between the network node and the wireless device; and a determining unit, or module, for determining whether the channel quality is acceptable or unacceptable. The computer program further comprises a transmitting unit, or module, for comprises transmitting, to the wireless device, an indication of which RBG(s) to report channel quality measurements for, when the channel quality is unacceptable.

The computer program modules could essentially perform the actions of the flow illustrated in FIGS. 1a-1d, to emulate the network node 600. In other words, when the different computer program modules are executed in the processing unit 1106, they may correspond to the units 603-605 of FIG. 6.

Figure 10:
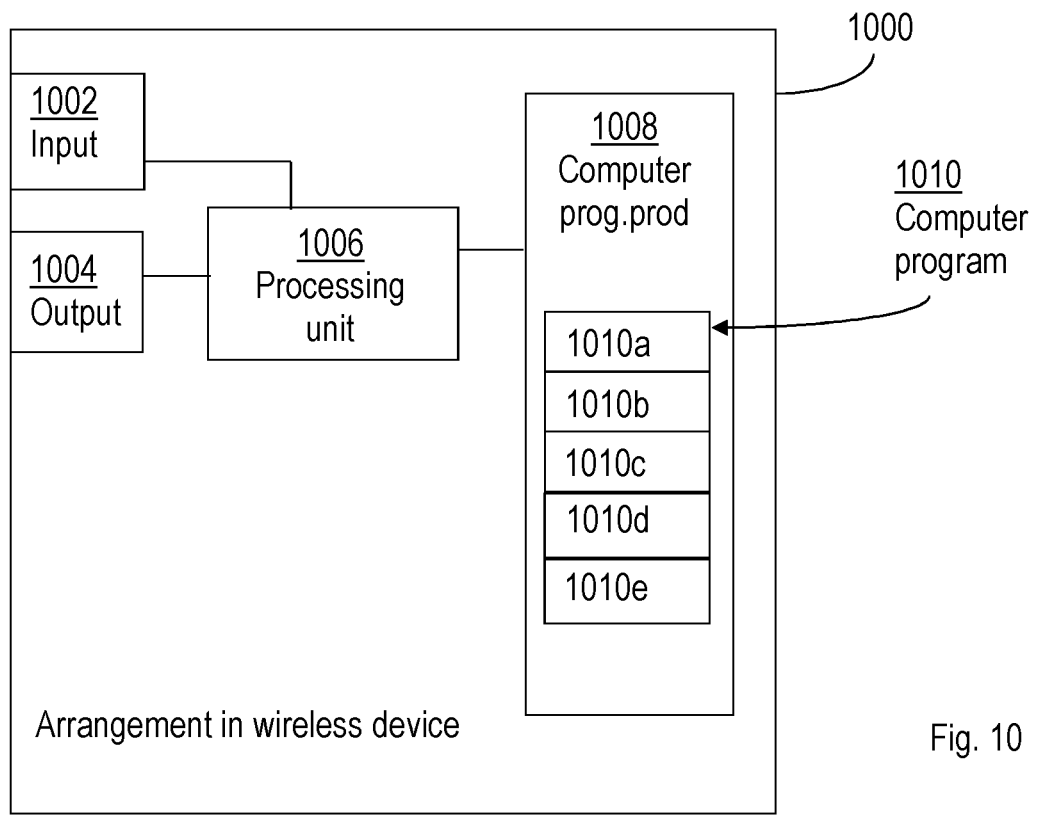
FIG. 10 is a block diagram of an arrangement in a wireless device for communicating with a network node according to an exemplifying embodiment.

FIG. 10 schematically shows an embodiment of an arrangement 1200 in a wireless device 800. Comprised in the arrangement 1200 in the wireless device 800 are here a processing unit 1206, e.g. with DSP. The processing unit 1206 may be a single unit or a plurality of units to perform different actions of procedures described herein. The arrangement 1200 of the wireless device 800 may also comprise an input unit 1202 for receiving signals from other entities, and an output unit 1204 for providing signal(s) to other entities. The input unit and the output unit may be arranged as an integrated entity or as illustrated in the example of FIG. 8, as one or more interfaces 801.

Furthermore, the arrangement 1200 in the wireless device 800 comprises at least one computer program product 1208 in the form of a non-volatile memory, e.g. an EEPROM, a flash memory and a hard drive. The computer program product 1208 comprises a computer program 1210, which comprises code means, which when executed in the processing unit 1206 in the arrangement 1200 in the wireless device 800 causes the wireless device to perform the actions e.g. of the procedure described earlier in conjunction with FIGS. 3a-3b.

The computer program 1210 may be configured as a computer program code structured in computer program modules 1210a-1210e. Hence, in an exemplifying embodiment, the code means in the computer program of the arrangement 1200 in the wireless device 800 comprises a receiving unit, or module, for receiving, from the network node, an indication of which RBG(s) to report channel quality measurements for, when the channel quality is unacceptable, wherein the indication excludes at least the first and the last RBG at the frequency band edges; and a performing unit, or module, for performing a channel quality measurement at least for the RBG(s) specified in the indication. The computer program further comprises a transmitting unit, or module, for transmitting, to the network node, a channel quality measurement report for the RBG(s) specified in the indication.

The computer program modules could essentially perform the actions of the flow illustrated in FIGS. 3a-3b, to emulate the wireless device 800. In other words, when the different computer program modules are executed in the processing unit 1206, they may correspond to the units 803-805 of FIG. 8.

Although the code means in the embodiments disclosed above in conjunction with FIGS. 6 and 8 are implemented as computer program modules which when executed in the respective processing unit causes the network node and the wireless device to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for communicating with a wireless device, the network node and the wireless device being operable in a wireless communication network employing Orthogonal Frequency Division Multiplexing, OFDM technology wherein a channel between the network node and the wireless device comprises a set of Resource Block Groups, RBGs, the method comprising:

receiving, from the wireless device, a measurement report indicating a channel quality of the channel between the network node and the wireless device, determining whether the channel quality is acceptable or unacceptable, and transmitting, to the wireless device, an indication of which RBG(s) to report channel quality measurements for, when the channel quality is unacceptable;

wherein:

the indication comprises a bitmap indicating which RBG(s) to report channel quality measurements for and which RBGs to exclude; and the RBG(s) to report channel quality measurements for excludes at least a first RBG and a last RBG at frequency band edges of a bandwidth of the channel.

2. The method according to claim 1, wherein the determining of whether the channel quality is acceptable or unacceptable comprises comparing the channel quality to a quality threshold.

3. The method according to claim 1, further comprising selecting which RBG(s) to be included in the indication of which RBG(s) to report channel quality measurements for, when the channel quality is unacceptable.

4. The method according to claim 1, wherein the measurement report indicating the channel quality comprises a wideband Channel Quality Indicator, CQI.

5. The method according to claim 1, further comprising, scheduling transmissions to the wireless device on the RBG(s) that are comprised in the indication of which RBG(s) to report channel quality measurements for.

6. A method performed by a wireless device for communicating with a network node, the wireless device and the network node being operable in a wireless communication network employing Orthogonal Frequency Division Multiplexing, OFDM technology wherein a channel between the network node and the wireless device comprises a set of Resource Block Groups, RBGs, the method comprising:

receiving, from the network node, an indication of which RBG(s) to report channel quality measurements for, when the channel quality is unacceptable, wherein the indication excludes at least a first RBG and a last RBG at frequency band edges of a bandwidth of the channel, performing a channel quality measurement at least for the RBG(s) specified in the indication, and transmitting, to the network node, a channel quality measurement report for the RBG(s) specified in the indication;

wherein:

the indication comprises a bitmap indicating which RBG(s) to report channel quality measurements for and which RBGs to exclude.

7. The method according to claim 6, wherein the channel quality measurement report indicating the channel quality comprises a wideband Channel Quality Indicator, CQI.

8. The method according to claim 6, further comprising, when the wireless device is currently reporting channel quality measurements for RBG(s) specified by the network node:

receiving, from the network node, an indication to stop limiting the reporting of channel quality measurements for the RBG(s) specified by the network node, performing a channel quality measurement for all, or any, RBGs of the channel, and transmitting a measurement report for the performed channel quality measurements to the network node.

9. A network node for communicating with a wireless device, the network node and the wireless device being operable in a wireless communication network employing Orthogonal Frequency Division Multiplexing, OFDM technology wherein a channel between the network node and the wireless device comprises a set of Resource Block Groups, RBGs, the network node comprising a processor coupled to a memory and configured for:

receiving, from the wireless device, a measurement report indicating a channel quality of the channel between the network node and the wireless device, determining whether the channel quality is acceptable or unacceptable, and transmitting, to the wireless device, an indication of which RBG(s) to report channel quality measurements for, when the channel quality is unacceptable;

wherein the indication comprises a bitmap indicating which RBG(s) to report channel quality measurements for and which RBGs to exclude;

wherein the RBG(s) to report channel quality measurements for excludes at least a first RBG and a last RBG at frequency band edges of a bandwidth of the channel.

10. The network node according to claim 9, further being configured for determining whether the channel quality is acceptable or unacceptable by comparing the channel quality to a quality threshold.

11. The network node according to claim 10, further being configured for selecting which RBG(s) to be included in the indication of which RBG(s) to report channel quality measurements for, when the channel quality is unacceptable.

12. The network node according to claim 9, wherein the measurement report indicating the channel quality comprises a wideband Channel Quality Indicator, CQI.

13. The network node according to claim 9, further being configured for scheduling transmissions to the wireless device on the RBG(s) that are comprised in the indication of which RBG(s) to report channel quality measurements for.

14. A wireless device for communicating with a network node, the wireless device and the network node being operable in a wireless communication network employing Orthogonal Frequency Division Multiplexing, OFDM technology wherein a channel between the network node and the wireless device comprises a set of Resource Block Groups, RBGs, the wireless device comprising a processor coupled to a memory and configured for:

receiving, from the network node, an indication of which RBG(s) to report channel quality measurements for, when the channel quality is unacceptable, wherein the indication excludes at least a first RBG and a last RBG at frequency band edges of a bandwidth of the channel, performing a channel quality measurement at least for the RBG(s) specified in the indication, and transmitting, to the network node, a channel quality measurement report for the RBG(s) specified in the indication;

wherein the indication comprises a bitmap indicating which RBG(s) to report channel quality measurements for and which RBGs to exclude.

15. The wireless device according to claim 14, wherein the channel quality measurement report indicating the channel quality comprises a wideband Channel Quality Indicator, CQI.

16. The wireless device according to claim 14, further being configured for, when the wireless device is currently reporting channel quality measurements for RBG(s) specified by the network node:
  receiving, from the network node, an indication to stop limiting the reporting of channel quality measurements for the RBG(s) specified by the network node,
  performing a channel quality measurement for all, or any, RBGs of the channel, and
  transmitting a measurement report for the performed channel quality measurements to the network node.

\* \* \* \* \*